US010714747B2

(12) United States Patent
Kim et al.

(10) Patent No.: US 10,714,747 B2
(45) Date of Patent: Jul. 14, 2020

(54) HIGH ENERGY LITHIUM ION SECONDARY BATTERY WITH IMPROVED LIFETIME AND ENERGY DENSITY

(71) Applicant: Bayerische Motoren Werke Aktiengesellschaft, Munich (DE)

(72) Inventors: Sung-Jin Kim, Munich (DE); Georg Steinhoff, Unterhaching (DE); Peter Lamp, Landsberg am Lech (DE); Yang-Kook Sun, Seoul (KR)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 289 days.

(21) Appl. No.: 15/381,716

(22) Filed: Dec. 16, 2016

(65) Prior Publication Data
US 2018/0175387 A1 Jun. 21, 2018

(51) Int. Cl.
| | |
|---|---|
| *H01M 4/525* | (2010.01) |
| *H01M 10/0525* | (2010.01) |
| *H01M 4/38* | (2006.01) |
| *H01M 4/36* | (2006.01) |
| *H01M 4/587* | (2010.01) |
| *H01M 4/485* | (2010.01) |
| *H01M 4/505* | (2010.01) |
| *H01M 4/134* | (2010.01) |
| *H01M 4/133* | (2010.01) |
| *H01M 4/131* | (2010.01) |
| *H01M 4/02* | (2006.01) |

(52) U.S. Cl.
CPC ........... *H01M 4/525* (2013.01); *H01M 4/131* (2013.01); *H01M 4/133* (2013.01); *H01M 4/134* (2013.01); *H01M 4/366* (2013.01); *H01M 4/386* (2013.01); *H01M 4/485* (2013.01); *H01M 4/505* (2013.01); *H01M 4/587* (2013.01); *H01M 10/0525* (2013.01); *H01M 2004/021* (2013.01); *H01M 2220/20* (2013.01); *Y02E 60/122* (2013.01); *Y02T 10/7011* (2013.01)

(58) Field of Classification Search
CPC ...... H01M 4/525; H01M 4/386; H01M 4/366; H01M 4/587; H01M 4/485; H01M 4/505; H01M 4/131; H01M 4/133; H01M 4/134; H01M 10/0525; H01M 2004/021; H01M 2220/20; Y02E 60/122; Y02T 10/7011
See application file for complete search history.

(56) References Cited

U.S. PATENT DOCUMENTS

2016/0197343 A1 * 7/2016 Jeong ............... H01M 4/386
429/219

OTHER PUBLICATIONS

Adelhelm et al. "The impact of carbon materials on the hydrogen storage properties of light metal hyrdrides", *Journal of Materials Chemistry*, 2011, vol. 21, pp. 2417-2427.
Beattie et al. "Si Electrodes for Li-Ion Batteries—A New Way to Look at an Old Problem", *Journal of Electrochemical Society*, 2008, vol. 155 (2), pp. A158-A163.

(Continued)

*Primary Examiner* — Laura Weiner
(74) *Attorney, Agent, or Firm* — Crowell & Moring LLP

(57) ABSTRACT

A high energy density lithium-ion rechargeable battery cell is provided which includes an anode material containing a carbon-nanotube (CNT)-Si composite and a cathode material containing a core-shell gradient and/or concentration gradient nickel-based lithium metal oxide.

13 Claims, 9 Drawing Sheets
(6 of 9 Drawing Sheet(s) Filed in Color)

200nm

CNT-Si composite particle with strains

(56) References Cited

OTHER PUBLICATIONS

Lim et al. "Advanced Concentration Gradient Cathode Material with Two-Slope for High-Energy and Safe Lithium Batteries", *Advanced Functional Materials*, 2015, vol. 25, pp. 4673-4680.

Noh et al. "Cathode Material with Nanorod Structure—An Application for Advanced High-Energy and Safe Lithium Batteries", *Chemistry of Materials*, 2013, vol. 25, pp. 2109-2115.

Noh et al. "Comparison of the structural and electrochemical properties of layered Li[Ni$_x$Co$_y$Mn$_z$]O$_2$ (x=1/3, 0.5, 0.6, 0.7, 0.8 and 0.85) cathode material for lithium-ion batteries", *Journal of Power Sources*, 2013, vol. 233, pp. 121-130.

Obrovac et al. "Structural Changes in Silicon Anodes during Lithium Insertion/Extraction", *Electrochemical and Solid-State Letters*, 2004, vol. 7(5), pp. A93-A96.

Sun et al. "Synthesis and Characterization of Li[N$_{0.8}$Co$_{0.1}$Mn$_{0.1}$)$_{0.8}$(Ni$_{0.5}$Mn$_{0.5}$)$_{0.2}$]O$_2$ with the Microscale Core-Shell Structure as the Positive Electrode Material for Lithium Batteries", *Journal of American Chemical Society*, 2005, vol. 127, pp. 13411-13418.

Sun et al. "High-Energy cathode material for long-life and safe lithium batteries", *Nature Materials*, Apr. 2009, vol. 8, pp. 320-324.

Sun et al. "Nanostructured high-energy cathode materials for advanced lithium batteries", *Nature Materials*, Nov. 2012, vol. 11, pp. 942-947.

Wang et al. "Self-healing chemistry enables the stable operation of silicon microparticle anodes for high-energy lithium-ion batteries", *Nature Chemistry*, Dec. 2013, vol. 5, pp. 1042-1048.

Wu et al. "Designing nanostructured Si anodes for high energy lithium ion batteries", *Nano Today*, 2012, vol. 7, pp. 414-429.

Lee et al. "High-energy-density lithium-ion battery using a carbon-nanotube-Si composite anode and a compositionally graded Li[Ni$_{0.85}$Co$_{0.05}$Mn$_{0.10}$]O$_2$ cathode", *Energy & Environmental Science*, 2016, vol. 9, pp. 2152-2158.

Lee et al. "High-energy-density lithium-ion battery using carbon-nanotube-Si composite anode and compositionally graded Li[Ni$_{0.85}$Co$_{0.05}$Mn$_{0.10}$]O$_2$ cathode" (Supplementary Information of C12), *Energy & Environmental Science*, 2016, vol. 9, pp. 1-12.

\* cited by examiner

10~15nm
Porous Si

200nm
CNT-Si composite
particle with strains

FIG. 3C
FIG. 3D
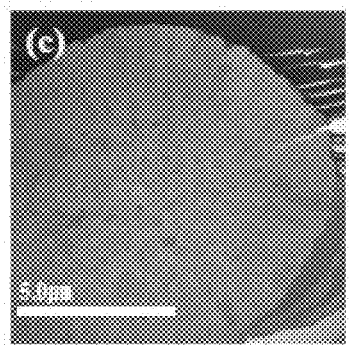
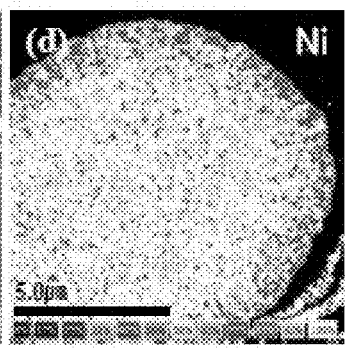
FIG. 3E
FIG. 3F
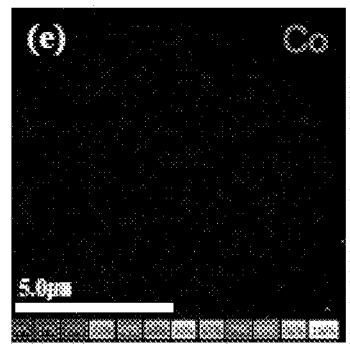
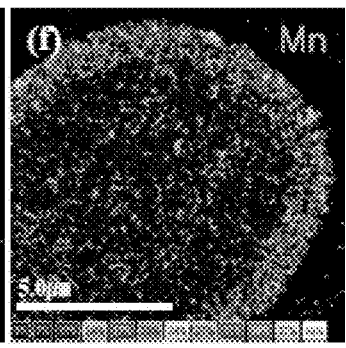

HIGH ENERGY LITHIUM ION SECONDARY BATTERY WITH IMPROVED LIFETIME AND ENERGY DENSITY

FIELD OF THE INVENTION

The present disclosure relates to a high energy density lithium-ion rechargeable battery cell composed of an anode material containing carbon-nanotube (CNT)-Si composite and a cathode material containing a core-shell gradient and/or concentration gradient nickel-based lithium metal oxide.

BACKGROUND OF THE INVENTION

Lithium-ion batteries (LIBs) have the highest gravimetric and volumetric energy densities among the commercialized batteries that can provide electric drives for plug-in hybrid (PHEVs) and fully electric vehicles (EVs). All lithium-ion battery cells are built from a positive electrode (cathode) and a negative electrode (anode), electrically isolated by a thin separator and combined with a liquid transporting medium, the electrolyte. Both the anode and the cathode contain active materials into which lithium ions insert and extract. The lithium ions move through an electrolyte from the negative electrode (anode) to the positive electrode (cathode) during discharge, and in reverse, from the positive electrode (cathode) to the negative electrode (anode), during recharge. The anode is typically composed of lithium, dissolved as ions, into a carbon or in some cases metallic lithium. The cathode material is made up from lithium liberating compounds, typically electro-active oxide materials.

Electrode design has been a key aspect in achieving the energy and power density, and life performance required for electric vehicle (EV) batteries. High energy densities can only be realized by increasing the specific energies on both the cathode and the anode. Among the cathode materials, Ni-rich materials such as $LiNi_xMn_yCo_zO_2$ (NMC: x+y+z=1; e.g., x:y:z=8:1:1 (NMC811) and x:y:z=6:2:2 (NMC622)) and $Li[Ni_{0.8}Co_{0.15}Al_{0.05}]O_2$ (NCA) in particular are the most promising cathode candidates for EVs among the next-generation of high energy density cells owing to their high capacity, excellent rate capability, and low cost. Despite the advantages, increasing the Ni fraction in the NMC cathodes negatively impacts the lifetime and safety of the battery, particularly when higher cut-off voltages and high electrode packing densities are pursued (See e.g., H. J. Noh, et al., *J. Power Sources*, 2013, 233, 121). A number of strategies have been explored to increase the stability of the Ni-enriched NMC cathode material by suppressing the parasitic side reactions with the electrolyte. (See e.g., Y. K. Sun, et al., *J. Am. Chem. Soc.*, 2015, 127, 13411; Y. K. Sun, et al., *Nat. Mater.*, 2009, 8, 320; Y. K. Sun, et al., *Nat. Mater.*, 2012, 11, 942; H. J. Noh, et al., *Chem. Mater.*, 2013, 25, 2109; B. B. Lim, et al., *Adv. Funct. Mater.*, 2015, 25(29), 4673). Among the anode materials for LIBs, silicon (Si) exhibits the highest gravimetric capacity (3579 mA h/g when charged to $Li_{15}Si_4$); however, a large volume change during cycling often results in pulverization, electrical contact loss, and constant evolution of the solid-electrolyte interphase (SEI), leading to rapid capacity fading. (See e.g., M. N. Obrovac and L. Christensen, *Electrochem. Solid-State Lett.*, 2004, 7, A93; S. D. Beattie, et al., *J. Electrochem. Soc.*, 2008, 155, A158; H. Wu and Y. Cui, *Nano Today*, 2012, 7, 414; C. Wang et al., *Nat. Chem.*, 2013, 5, 1042).

Accordingly, it is an object of the present invention to overcome, or at least alleviate, one or more difficulties and deficiencies related to the prior art in developing a rechargeable lithium-ion battery delivering high energy density, excellent safety and cycle life. These and other objects and features of the present invention will be clear from the following disclosure.

SUMMARY OF THE INVENTION

In accordance with one or more aspects of the disclosure, the invention is directed to a high-energy density rechargeable Li-ion battery cell, assembled using the combination of a core-shell gradient and/or full concentration or sloped full concentration gradient nickel-based lithium metal oxide cathode and a composite anode consisting of nanoporous silicon encapsulated by carbon nanotubes (CNTs). The nickel-based lithium metal oxide is a compound having the following formula: $Li_aNi_xCo_yM_zO_2$, with $0.9<a<1.1$, $0.4<x<1$, $0<y<0.5$, $0<z<0.5$ and $x+y+z=1$, and M is at least one selected from the group consisting of Mg, Ca, Sr, Ba, Ti, Zr, Nb, Mo, W, Zn, Al, Si, Mn, Cr, Fe, Mg, Sr, V, and a rare earth element. A battery including the rechargeable Li-ion cell of the present invention meets the target for the energy, power density, and life performance required for electric vehicle (EV) batteries.

Other objects, advantages and novel features of the present invention will become apparent from the following detailed description of one or more preferred embodiments when considered in conjunction with the accompanying drawings. The disclosure is written for those skilled in the art. Although the disclosure uses terminology and acronyms that may not be familiar to the layperson, those skilled in the art will be familiar with the terminology and acronyms used herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3C is a cross-sectional TEM-EDS mapping of TSFCG Li[Ni$_{0.85}$Co$_{0.05}$Mn$_{0.10}$]O$_2$.

FIG. 3D is a cross-sectional TEM-EDS mapping of Ni of the as-prepared TSFCG Li[Ni$_{0.85}$Co$_{0.05}$Mn$_{0.10}$]O$_2$.

FIG. 3E is a cross-sectional TEM-EDS mapping of Co of the as-prepared TSFCG Li[Ni$_{0.85}$Co$_{0.05}$Mn$_{0.10}$]O$_2$.

FIG. 3F is a cross-sectional TEM-EDS mapping of Mn of the as-prepared TSFCG Li[Ni$_{0.85}$Co$_{0.05}$Mn$_{0.10}$]O$_2$.

DETAILED DESCRIPTION

The present invention provides a high-energy density Li-ion battery cell assembled using the combination of a cathode material containing a core-shell gradient and/or concentration gradient nickel-based lithium metal oxide and an anode material containing a composite consisting of nanoporous silicon encapsulated by carbon nanotubes (CNTs). In one embodiment, the silicon and carbon nanotubes composite present in the anode material is in an amount of about 60 to 95% by weight. In one embodiment, the nickel-based lithium metal oxide present in the cathode material is in amount of about 85 to 97% by weight. In another embodiment, the anode material includes a conductive additive and a binder. In yet another embodiment, the cathode material includes a conductive additive and a binder.

According to one aspect of the present invention, the CNT-Si composite for the anode is fabricated via simple ball-milling of nanoporous Si and carbon nanotubes (CNTs). In one embodiment, the nanoporous silicon and the carbon nanotubes are mixed at a weight ratio of 85:15. During ball-milling, the CNTs consolidate the individual Si nanoparticles such that each secondary particle (agglomerates of primary particles) after the ball milling consisted of nano-sized Si primary particles. In one embodiment, the silicon and carbon nanotubes composite contains at least one secondary particle having at least two agglomerates of primary particles, each primary particle has an average particle diameter in the range of about 100 nm to about 500 nm. The secondary particle has an average particle diameter in the range of about 2 to 3 μm.

Figure 1A:
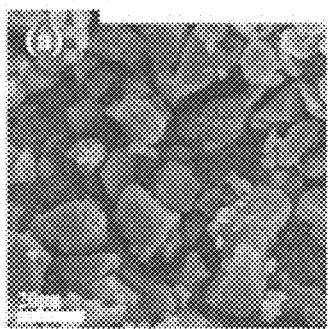
FIG. 1A is a SEM image of porous Si particles.
Figure 1B:
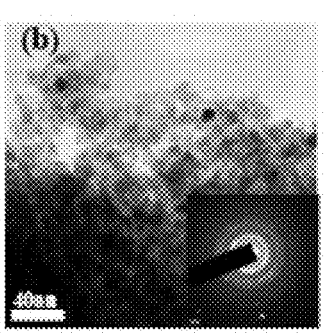
FIG. 1B is a TEM image of porous Si particles.
Figure 1C:
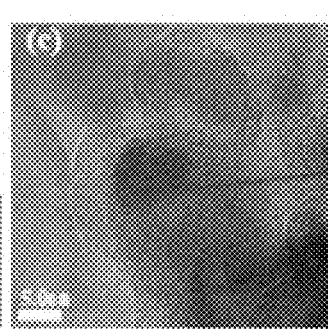
FIG. 1C is a HR-TEM image of a single porous Si particle with a particle size of 10-15 nm.

For example, as shown in FIG. 1A-C, prior to ball milling with CNTs, the porous Si was a cluster of Si nanoparticles that were of 10-20 nm in diameter. (See the Scanning Electron Microscopy (SEM) (FIG. 1A) and Transmission Electron Microscopy TEM images (FIG. 1B) of porous Si particles). As another example, FIG. 1C shows a high resolution TEM image of a single porous Si particle with a particle size of 10-15 nm prior to milling. High-energy ball milling crushed the loosely held agglomerates of nanoporous Si powder to form 2-3 μm-sized agglomerates or secondary particles while narrowing the particle size distribution. It appears that the mechanical energy injected via ball milling was sufficient to consolidate the Si nanoparticles into a much larger single-crystalline particle. The consolidation of the Si nanoparticles was aided by the fact that melting of nanoparticles, in general, occurs at a temperature much lower than that of the bulk counterpart (See e.g., M. Zhang, et al., *Phys. Rev. B: Condens. Matter Mater. Phys.*, 2000, 62, 10548). During ball milling, the presence of CNTs facilitates the consolidation by minimizing the oxidation and amorphization of the Si nanoparticles by acting as a lubricant and oxygen scavenger (See e.g., P. Adelhelm, et al., *J. Mater. Chem.*, 2011, 21, 2417).

Figure 1D:
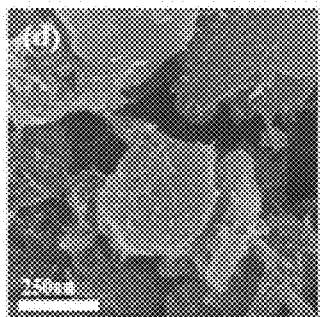
FIG. 1D is a SEM image of CNT-Si composite particles.
Figure 1E:
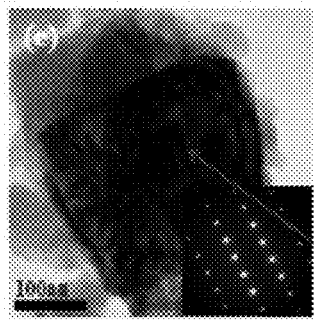
FIG. 1E is a TEM image of a single CNT-Si composite particle with strains having a particle size of 200 nm.
Figure 1F:
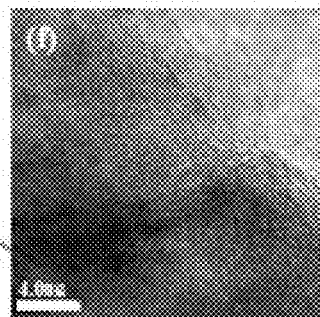
FIG. 1F is a HR-TEM image of a single CNT-Si composite particle.

FIG. 1D shows a SEM image of an exemplified CNT-Si composite after ball-milling. In agreement with the SEM analysis, the CNT-Si composite was an aggregation of CNT-encapsulated Si particles. FIG. 1E shows a TEM image of an exemplified single CNT-Si composite particle with strains having a particle size of 200 nm. The composite particle was highly strained likely due to the structural defects developed during the consolidation of the nanoparticles. A high-resolution TEM image of an exemplified single CNT-Si composite particle after ball-milling is shown in FIG. 1F. The HR-TEM image shows that the Si nanoparticles are covered with a thin layer of CNTs.

Figure 2A:
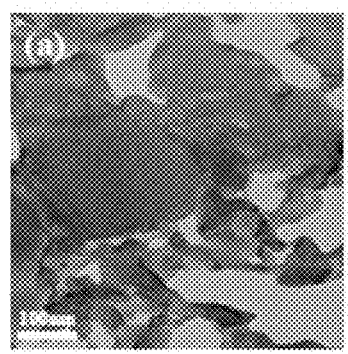
FIG. 2A is a cross-sectional TEM-EDS mapping of a cut 2 μm CNT-Si composite particle.
Figure 2B:
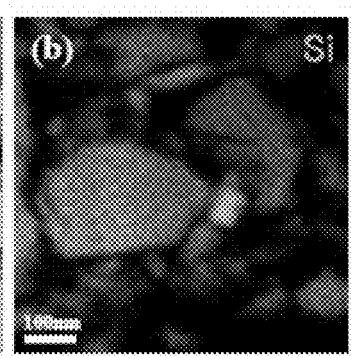
FIG. 2B is a cross-sectional TEM-EDS mapping of silicon in the same CNT-Si composite particle.
Figure 2C:
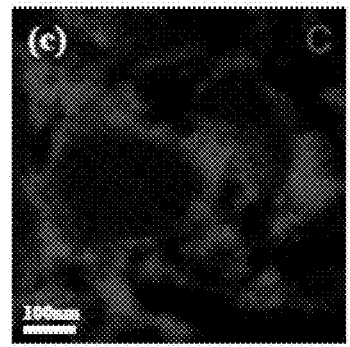
FIG. 2C is a cross-sectional TEM-EDS mapping of carbon in the same CNT-Si composite particle.
Figure 2D:
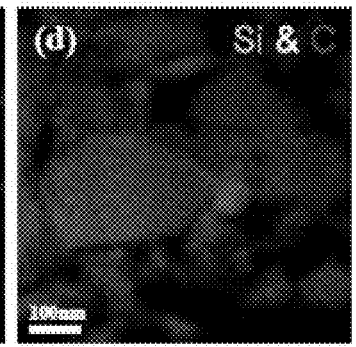
FIG. 2D is a cross-sectional TEM-EDS mapping of silicon and carbon in the same CNT-Si composite particle.

As another example, FIG. 2A shows a cross-sectional TEM-EDS mapping of a cut 2 μm CNT-Si composite particle. Also shown are the cross-sectional TEM-EDS mapping of silicon (FIG. 2B), carbon (FIG. 2C), and silicon and carbon (FIG. 2D) in the same CNT-Si composite particle. These figures show that silicon particles are well encapsulated by carbon and that there is a good dispersion of the two materials. The CNT-Si composite consisted of 100-200 nm sized Si primary particles.

The CNT-Si composite of the present invention prepared using the ball-milling process has high capacity and extremely stable long-term cycling, it can deliver a capacity ranging from about 800 to 2800 mA h g$^{-1}$ and a tap density ranging from about 0.88 to 1.32 g cm$^{-3}$.

Table 1 below compares the tap densities, specific capacities, and volumetric capacities of milled CNT-Si (MCSC) with other reported Si anode materials. Based on Table 1, milled CNT-Si (MCSC) exhibited the best tap density, specific capacity and volumetric capacity among the reported Si anode materials.

TABLE 1

| Samples | Tap (g cm$^{-3}$) | Specific capacity (mAh g$^{-1}$) | Volumetric capacity (mAh cm$^{-3}$) |
|---|---|---|---|
| Nano-Si | 0.16 | 1800 | 288 |
| Graphite | 1.16 | 360 | 418 |
| C-Si CVD | 0.49 | 1950 | 956 |
| C$_2$H$_2$ absorbed porous Si | 0.78 | 1544 | 1204 |
| Ball-milled Si | 0.7 | 1800 | 1260 |
| Porous Si | 0.285 | 1170 | 333 |
| MCSC | 1.103 | 2364 | 2607 |

Table 2 below compares the 1$^{st}$ charge and 1$^{st}$ discharge capacity at current density 400 mA/g, 1$^{st}$ cycle coulombic efficiencies, 1$^{st}$ discharge capacity, and 50$^{th}$ cycle retentions at 1 A/g of bulk Si, milled bulk Si, milled CNT-bulk Si composite, porous Si, milled porous Si and milled CNT-Si (MCSC). Based on Table 2, MCSC as the anode showed excellent capacity retention. In addition, MCSC exhibited good 1$^{st}$ cycle efficiencies as well as high discharge capacity retention at 1 A/g.

TABLE 2

| Samples | 1$^{st}$ charge (400 mA/g) | 1$^{st}$ discharge (400 mA/g) | 1$^{st}$ cycle coulombic efficiencies | 1$^{st}$ discharge (1 A/g) | 50$^{th}$ cycle retentions (1 A/g) |
|---|---|---|---|---|---|
| Bulk Si | 4166.8 mAh/g | 2739.4 mAh/g | 65.7% | 497.3 mAh/g | 0.9% (4.6 mAh/g) |
| Milled bulk Si | 3926.8 mAh/g | 3165.3 mAh/g | 80.6% | 1909.0 mAh/g | 27.8% (531.4 mAh/g, 28$^{th}$ cycles) |
| Milled CNT-bulk Si Composite | 3120.5 mAh/g | 2658.9 mAh/g | 85.3% | 2300.4 mAh/g | 81.7% (1880.6 mAh/g, 15$^{th}$ cycles) |
| Porous Si | 2318.4 mAh/g | 1169.9 mAh/g | 50.4% | 917.8 mAh/g | 97.3% (893.3 mAh/g) |
| Milled porous Si | 3367.4 mAh/g | 2492.4 mAh/g | 74.0% | 1640.1 mAh/g | 46.4% (761.2 mAh/g, 30$^{th}$ cycles) |
| MCSC | 2923.6 mAh/g | 2363.7 mAh/g | 80.8% | 2081.7 mAh/g | 97.4% (2027.2 mAh/g) |

Recently, a concentration-gradient cathode material based on a layered lithium nickel-manganese-cobalt oxide was developed to obtain maximum possible discharge capacity by having a Ni-enriched core and an outer Mn-rich outer layer to simultaneously ensure high chemical and thermal stability. This cathode material delivers a high capacity of more than 220 mA h g$^{-1}$. In addition, this cathode is a compositionally graded cathode material in which concentrations of the transitional metals continuously vary from the particle center to the surface. The graded cathodes have demonstrated remarkable improvements over cathodes with single uniform composition, not only in life time and safety, but also in battery power due to the superior Li$^+$ diffusion kinetics. (See e.g., Y. K. Sun, et al., *J. Am. Chem. Soc.*, 2015, 127, 13411; Y. K. Sun, et al., *Nat. Mater.*, 2009, 8, 320; Y. K. Sun, et al., *Nat. Mater.*, 2012, 11, 942; H. J. Noh, et al., *Chem. Mater.*, 2013, 25, 2109; B. B. Lim, et al., *Adv. Funct. Mater.*, 2015, 25(29), 4673).

This new approach has made it possible to design and develop cathode materials with different gradient compositions and slopes within a particle. In one embodiment, the nickel-based lithium metal oxide described herein contains a concentration gradient. For example, the concentration gradient can be a full-concentration gradient (FCG) with or without shell, a two-slope full-concentration gradient (TS-FCG) with or without shell, or a core-shell-gradient (CSG) with or without shell. The nickel-based lithium metal oxide described herein is represented by the following formula: $Li_aNi_xCo_yM_zO_2$, with $0.9<a<1.1$, $0.4<x<1$, $0<y<0.50<z<0.5$ and $x+y+z=1$, and M is at least one selected from the group consisting of Mg, Ca, Sr, Ba, Ti, Zr, Nb, Mo, W, Zn, Al, Si, Mn, Cr, Fe, Mg, Sr, V, and a rare earth element. Preferably, M is manganese or aluminum. Examples of nickel-rich lithium metal oxide which can be used to prepare the cathode include, but not limited to, $Li[Ni_{0.85}Co_{0.05}Mn_{0.10}]O_2$, $Li[Ni_{0.80}Co_{0.05}Mn_{0.15}]O_2$ and $Li[Ni_{0.8}Co_{0.15}Al_{0.05}]O_2$. In one embodiment, the cathode is comprised of $Li[Ni_{0.85}Co_{0.05}Mn_{0.10}]O_2$ containing a two-sloped full concentration gradient (TSFCG).

Figure 3A:
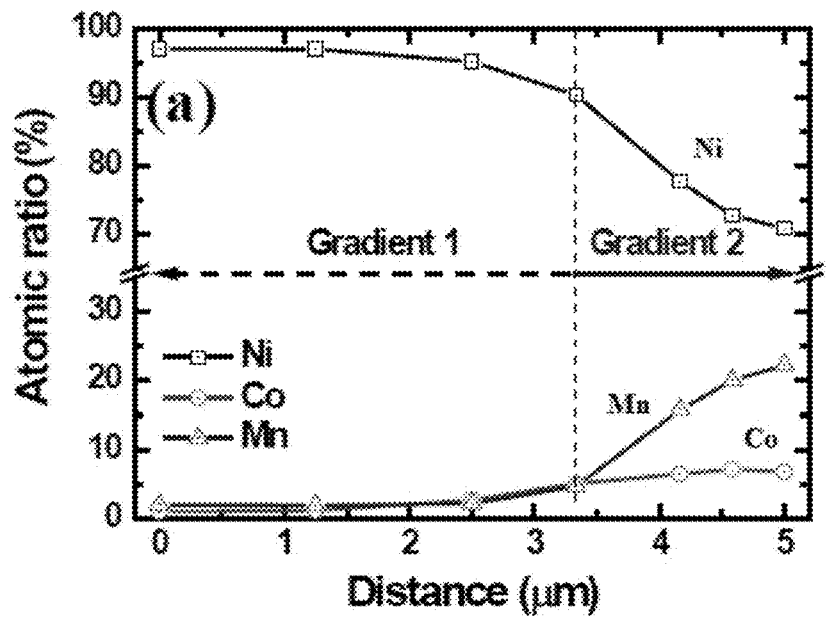
FIG. 3A is a EPMA line scan of the integrated atomic ratio of transition metals Ni, Mn and Co as a function of the distance from the particle center to the surface for TSFCG, the precursor $[Ni_{0.85}Co_{0.05}Mn_{0.10}](OH)_2$.
Figure 3B:
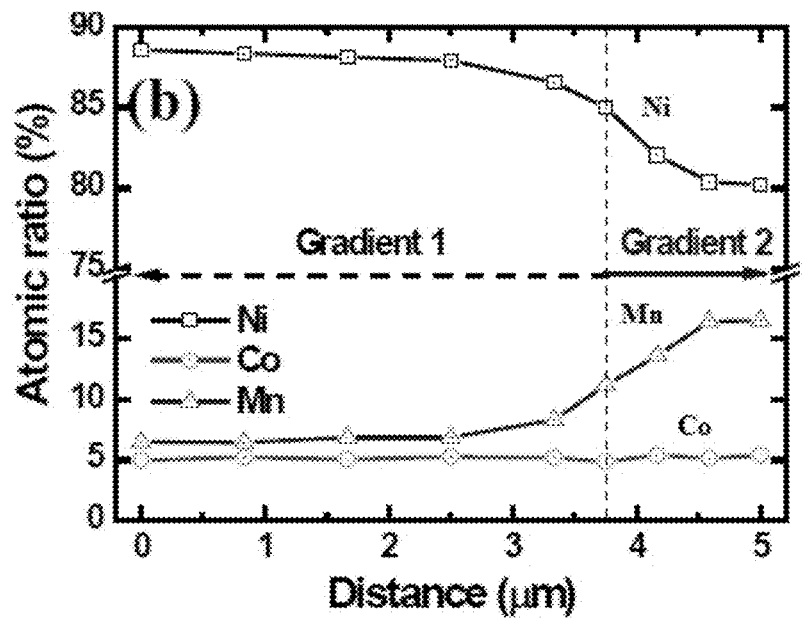
FIG. 3B is a EPMA line scan of the integrated atomic ratio of transition metals Ni, Mn and Co as a function of the distance from the particle center to the surface for a TSFCG lithiated $Li[Ni_{0.85}Co_{0.05}Mn_{0.10}]O_2$.

FIG. 3 shows an electron probe micro analysis (EPMA) line scan of the integrated atomic ratio (%) of transition metals Ni, Mn and Co as a function of the distance (μm) from the particle center to the surface for TSFCG, the precursor $[Ni_{0.85}Co_{0.05}Mn_{0.10}](OH)_2$ (FIG. 3A) and as a function of the distance from the particle center to the surface of TSFCG $Li[Ni_{0.85}Co_{0.05}Mn_{0.10}]O_2$ (FIG. 3B). The concentration gradients in general are well maintained. During calcination, diffusion of the ions takes place changing their distribution in the final active material.

FIG. 3C shows a cross-sectional TEM-EDS mapping of TSFCG $Li[Ni_{0.85}Co_{0.05}Mn_{0.10}]O_2$. To clarify the compositional graded structure of the TSFCG cathode prior to cycling, quantitative elemental mapping of Ni, Co and Mn of the as-prepared TSFCG $Li[Ni_{0.85}Co_{0.05}Mn_{0.10}]O_2$ was carried out on the cross-section sample (See FIGS. 3D, 3E, and 3F, respectively). As designed, the Ni content at the core was maximized using the two-slope approach to deliver the highest possible capacity while the surface was rich in Mn to stabilize the cathode surface. The crux of the two-slope design lies in the edge region (~1.2 μm thick) where a second Ni compositional gradient was introduced to induce a smooth structural transition from the Ni-rich core to the Ni-deficient surface. Meanwhile, Co maintained a flat gradient to support the rate capability. The mapping result matches well with the detailed quantitative analysis performed by electron probe micro analysis (EPMA) shown in FIGS. 3A and 3B.

Figure 4A:
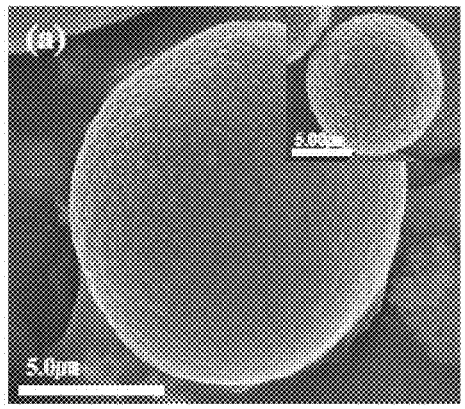
FIG. 4A is a SEM image of a single TSFCG, the precursor [Ni$_{0.85}$Co$_{0.05}$Mn$_{0.10}$](OH)$_2$.
Figure 4B:
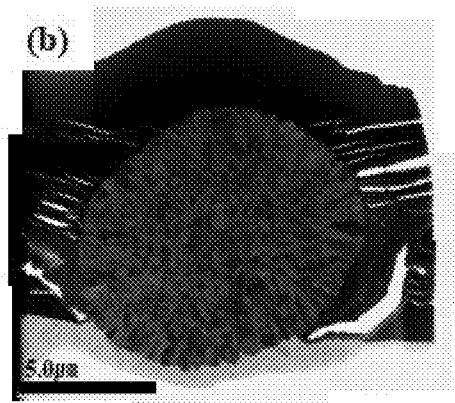
FIG. 4B is a SEM image of a TSFCG lithiated Li[Ni$_{0.85}$Co$_{0.05}$Mn$_{0.10}$]O$_2$.
Figure 4C:
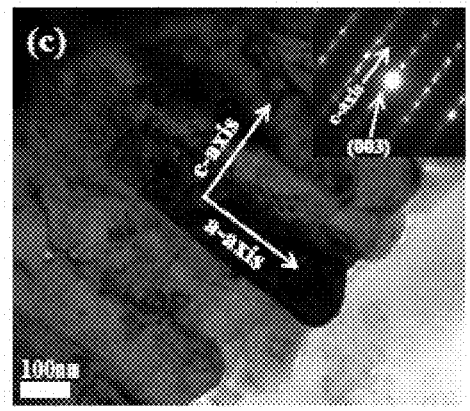
FIG. 4C is a cross-sectional TEM of a TSFCG Li[Ni$_{0.85}$Co$_{0.05}$Mn$_{0.10}$]O$_2$.
Figure 4D:
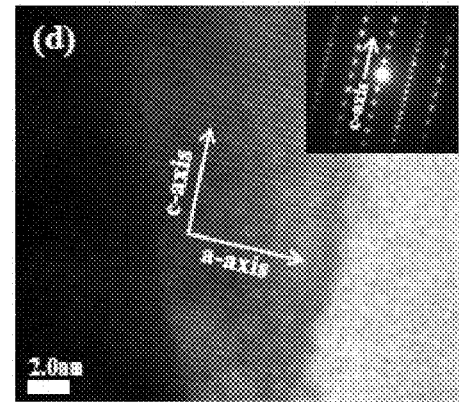
FIG. 4D is a magnified bright field HR-TEM image of a TSFCG Li[Ni$_{0.85}$Co$_{0.05}$Mn$_{0.10}$]O$_2$.
Figure 5A:
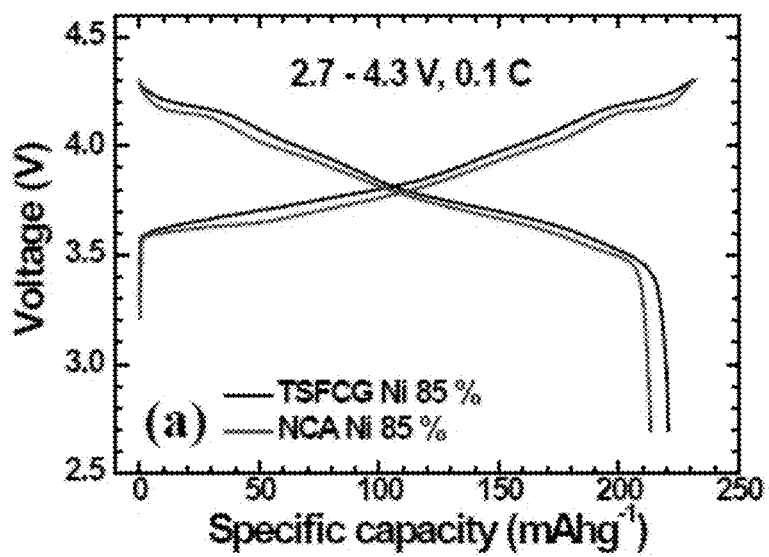
FIG. 5A shows the electrochemical performance of a TSFCG lithiated Li[Ni$_{0.85}$Co$_{0.05}$Mn$_{0.10}$]O$_2$ and a standard NCA Li[Ni$_{0.85}$Co$_{0.11}$Al$_{0.04}$]O$_2$ cathode in a half cell with a Li counter electrode with the 1$^{st}$ cycle voltage profiles at 0.1 C (20 mA g$^{-1}$).
Figure 5B:
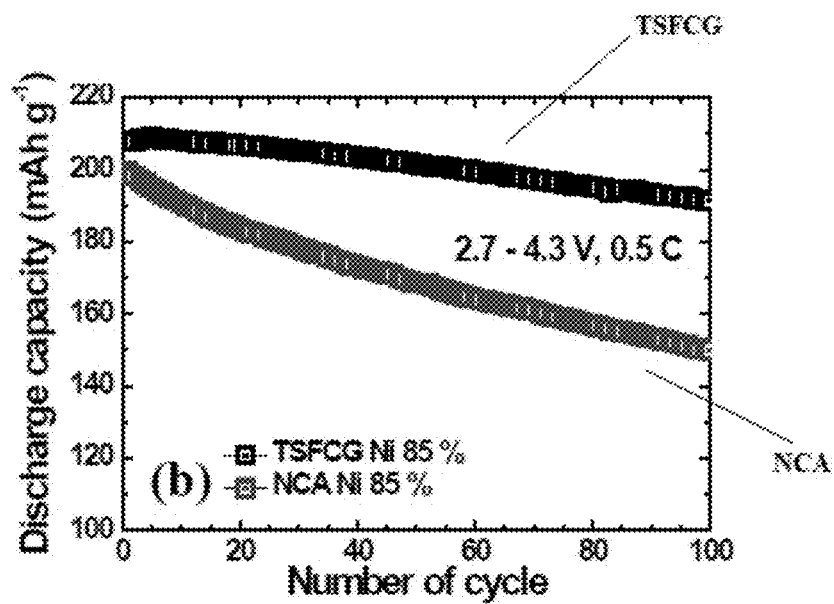
FIG. 5B shows the electrochemical performance of a TSFCG lithiated Li[Ni$_{0.85}$Co$_{0.05}$Mn$_{0.10}$]O$_2$ and a standard NCA Li[Ni$_{0.85}$Co$_{0.11}$Al$_{0.04}$]O$_2$ cathode in a half cell with a Li counter electrode, cycling performance at 0.5 C (100 mA g$^{-1}$) at 30° C.
Figure 5C:
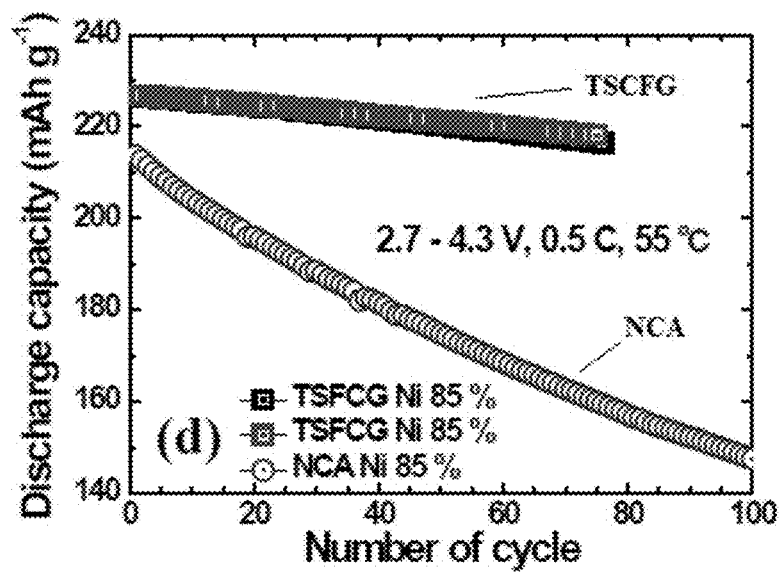
FIG. 5C shows the electrochemical performance of a TSFCG lithiated Li[Ni$_{0.85}$Co$_{0.05}$Mn$_{0.10}$]O$_2$ and a standard NCA Li[Ni$_{0.85}$Co$_{0.11}$Al$_{0.04}$]O$_2$ cathode in a half cell with a Li counter electrode, cycling performance at 0.5 C (100 mA g$^{-1}$) at 55° C.
Figure 5D:
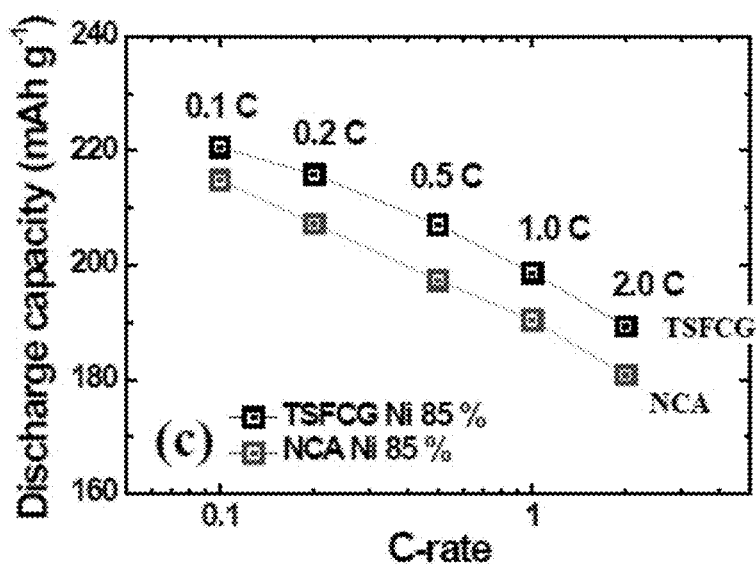
FIG. 5D shows the electrochemical performance of a TSFCG lithiated Li[Ni$_{0.85}$Co$_{0.05}$Mn$_{0.10}$]O$_2$ and a standard NCA Li[Ni$_{0.85}$Co$_{0.11}$Al$_{0.04}$]O$_2$ cathode in a half cell with a Li counter electrode, with rate capability using a constant current density between 0.1 C (20 mA g$^{-1}$) and 2 C (400 mA g$^{-1}$).
Figure 5E:
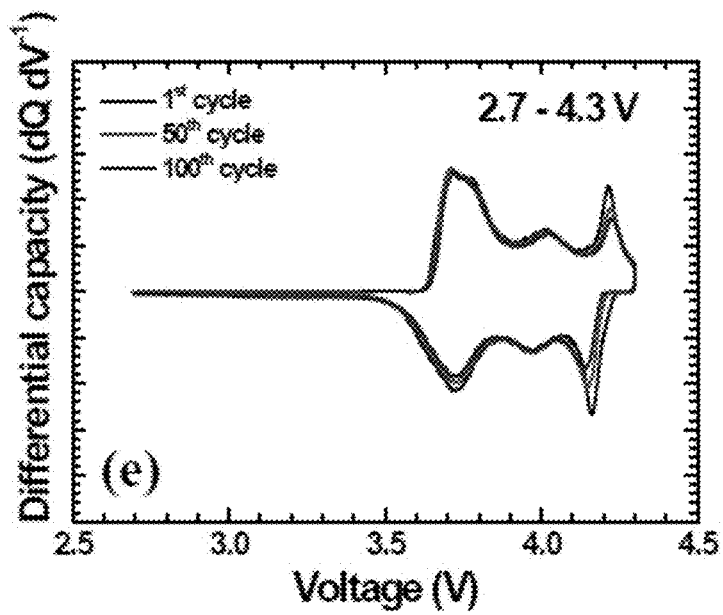
FIG. 5E shows the electrochemical performance of a TSFCG lithiated Li[Ni$_{0.85}$Co$_{0.05}$Mn$_{0.10}$]O$_2$ cathode in a half cell with a Li counter electrode: plotting differential capacity vs. voltage.
Figure 5F:
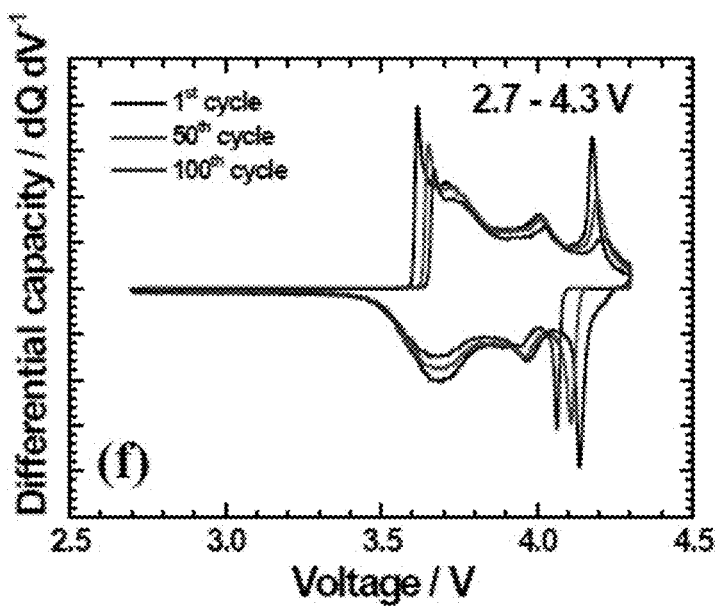
FIG. 5F shows the electrochemical performance of a standard NCA Li[Ni$_{0.85}$Co$_{0.11}$Al$_{0.04}$]O$_2$ cathode in a half cell with a Li counter electrode: plotting differential capacity vs. voltage.

FIG. 4A shows a SEM image of a single TSFCG particle, the precursor $[Ni_{0.85}Co_{0.05}Mn_{0.10}](OH)_2$. FIG. 4B shows a SEM image of the TSFCG lithiated $Li[Ni_{0.85}Co_{0.05}Mn_{0.10}]O_2$. FIG. 4C is a cross-sectional TEM image of a single TSFCG particle $Li[Ni_{0.85}Co_{0.05}Mn_{0.10}]O_2$, showing that the nanorod-shaped primary particles were arranged such that their longitudinal axes were pointing outward from the secondary particle center. In addition, the electron diffraction pattern from a primary particle indexed to the 110 zone in the inset of FIG. 4C affirms that the primary particles have a strong crystallographic texture in which the layered planes were oriented along the radial direction, hence expediting the $Li^+$ diffusion towards secondary particle center along the layered planes. In FIG. 4D, a magnified bright field high resolution HR-TEM image of the primary particle TSFCG $Li[Ni_{0.85}Co_{0.05}Mn_{0.10}]O_2$ verified that the (003) planes were indeed aligned in the radial direction.

FIG. 5 summarizes the electrochemical half-cell performance of the TSFCG $Li[Ni_{0.85}Co_{0.05}Mn_{0.10}]O_2$ cathode in comparison with a conventional standard NCA $Li[Ni_{0.85}Co_{0.11}Al_{0.04}]O_2$ cathode having equal Ni content. Typical voltage profiles of the TSFCG and NCA cathodes during the first cycle are shown in FIG. 5A at 0.1 C (20 mA $g^{-1}$) with an upper cutoff voltage of 4.3 V. The TSFCG cathode exhibited an initial discharge ($Li^+$ insertion) capacity of 221 mA $g^{-1}$, which was slightly higher than that of the NCA cathode (213 mA $g^{-1}$). FIG. 5B shows the electrochemical performance of a TSFCG lithiated $Li[Ni_{0.85}Co_{0.05}Mn_{0.10}]O_2$ and a standard NCA $Li[Ni_{0.85}Co_{0.11}Al_{0.04}]O_2$ cathode in a half cell with a Li counter electrode, cycling performance at 0.5 C (100 mA $g^{-1}$) at 30° C. However, the benefit of the TSFCG structure becomes clearly noticeable in FIG. 5B as the discharge capacity for the NCA cathode drops markedly during repeated Li-intercalation. Only 75% of the initial capacity was retained after 100 cycles, whereas the TSFCG cathode maintained 92% of its initial capacity. The superior cycle retention of the TSFCG cathode was accentuated in the high-temperature cycle performance at 55° C. (FIG. 5C). In spite of the high temperature, the TSFCG cathode exhibited excellent cycle performance, while the capacity of NCA deteriorated severely. In addition, the rod-shaped primary particles in a spoke-like pattern improved the mobility of the $Li^+$ ions, hence, the TSFCG $Li[Ni_{0.85}Co_{0.05}Mn_{0.10}]O_2$ cathode showed enhanced rate capability compared to the Ni-enriched NCA cathode. FIG. 5D shows the electrochemical performance of a TSFCG lithiated $Li[Ni_{0.85}Co_{0.05}Mn_{0.10}]O_2$ and a standard NCA $Li[Ni_{0.85}Co_{0.11}Al_{0.04}]O_2$ cathode in a half cell with a Li counter electrode, with rate capability using a constant current density between 0.1 C (20 mA $g^{-1}$) and 2 C (400 mA $g^{-1}$). As shown in FIG. 5D, the TSFCG $Li[Ni_{0.85}Co_{0.05}Mn_{0.10}]O_2$ cathode delivered 189.4 mA h $g^{-1}$ at 2 C (400 mA $g^{-1}$), which is equivalent to 86% of the capacity at 0.1 C. FIGS. 5E and 5F each shows the electrochemical performance of a TSFCG lithiated $Li[Ni_{0.85}Co_{0.05}Mn_{0.10}]O_2$ and a standard NCA $Li[Ni_{0.85}Co_{0.11}Al_{0.04}]O_2$ cathode in a half cell with a Li counter electrode: plotting differential capacity vs. voltage. The dQ/dV for the TSFCG cathode is well maintained during cycling (FIG. 5E). On the other hand for the standard NCA, the capacity (peak heights) is significantly reduced at the $100^{th}$ cycle (FIG. 5F).

Figure 6A:
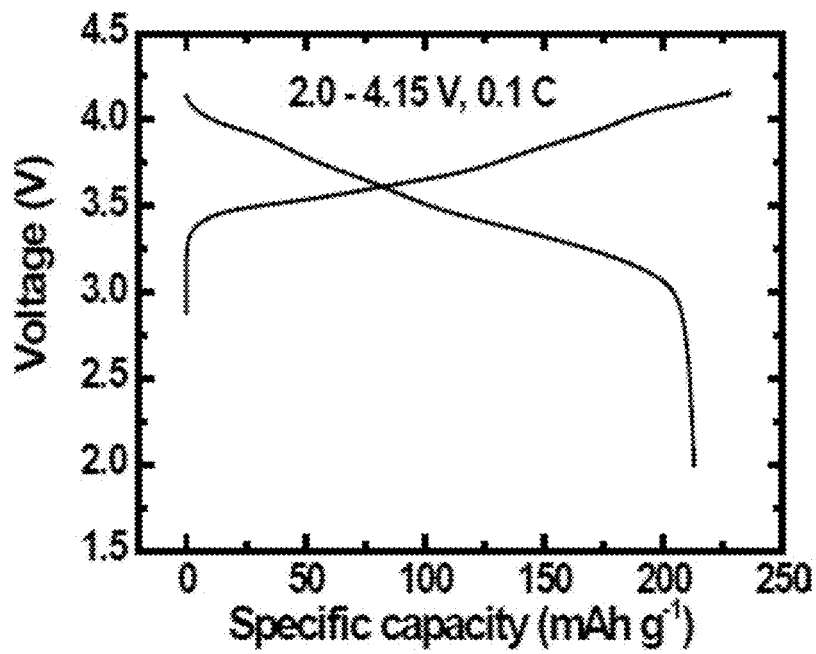
FIG. 6A shows the full cell performance of the CNT-Si composite anode and the TSFCG Li[Ni$_{0.85}$Co$_{0.05}$Mn$_{0.10}$]O$_2$ cathode in accordance with one or more aspects of the invention with a cycle voltage profile between 2.0 and 4.15 V at 0.1 C.

When integrating the CNT-Si composite and the TSFCG cathode in a full cell configuration, the full cell generated an energy density of 350 W h $kg^{-1}$ with excellent capacity retention for 500 cycles at IC rate, satisfying the energy density limit imposed by the drive range requirement for EVs. FIG. 6 summarizes the electrochemical full cell performance of the CNT-Si composite anode and the TSFCG $Li[Ni_{0.85}Co_{0.05}Mn_{0.10}]O_2$ cathode. FIG. 6A presents typical $1^{st}$ cycle voltage profiles for the full cell cycled at 0.1 C between 2.0 and 4.15 V. The $1^{st}$ cycle charge and discharge capacities were at 227.8 and 213.0 mA h $g^{-1}$, respectively, which amounts to 94% of the initial coulombic efficiency.

Figure 6B:
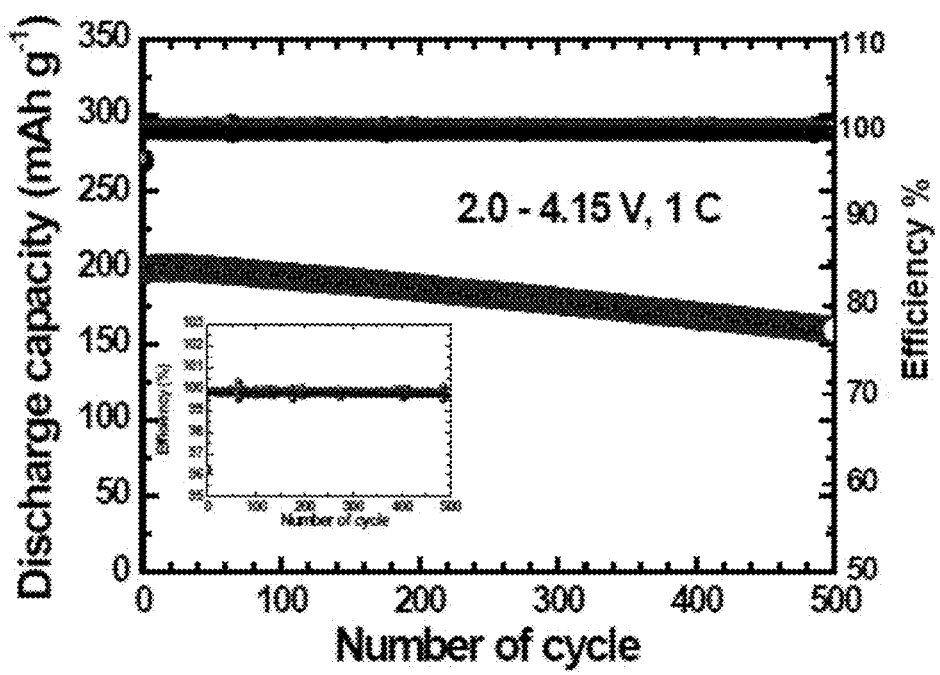
FIG. 6B shows the full cell performance of the CNT-Si composite anode and the TSFCG Li[Ni$_{0.85}$Co$_{0.05}$Mn$_{0.10}$]O$_2$ cathode in accordance with one or more aspects of the invention with cycling performance at 1 C (200 mA g$^{-1}$).

FIG. 6B shows the cycle performance and coulombic efficiency (inset) of the full cell when cycled between 2.0 and 4.15 V at 1 C rate. The CNT-Si/TSFCG full cell delivered 81% of the initial capacity after 500 cycles with an average coulombic efficiency of 99.8%.

Based on the various tests we conducted and the full cell data, the Li-ion cell of the present invention using the combination of nickel-rich lithium metal oxide active materials with gradient structure in the cathode and milled CNT-Si composite (MCSC) material in the anode delivers high energy density with excellent cycle life. The Li-ion rechargeable battery of the present invention satisfies the demands for energy storage for vehicle applications in terms of energy density, power and cycle life.

It should be recognized that the one or more examples in the disclosure are non-limiting examples and that the present invention is intended to encompass variations and equivalents of these examples.

EXAMPLES

Chemicals: N-methyl-2-pyrrolidone (NMP) solvent for making the cathode slurry can be obtained from Mitsubishi Chemical Corporation or BASF. Polyvinylidene fluoride (PVDF) binders can be obtained from Solvay S.A., Kureha, or Arkema. Conducting agent is sourced from IMERYS (formerly Timcal). Carboxylmethyl cellulose (CMC) and styrene-butadiene rubber (SBR) for making the anode can be obtained from JSR Corporation or Zeon Corporation.

Material Synthesis

Porous Si: Commercially available SiO (325 Mesh) from Aldrich was used as the starting material. The thermal disproportionation of SiO was performed in a box furnace at 970° C. for 30 h under $Ar/H_2$ gas flow (96% Ar, 4% $H_2$). After heat treatment, the resultant $Si/SiO_2$ powders were soaked for 4 h in HF solution to eliminate $SiO_2$. The obtained porous Si was washed with distilled water several times to remove the HF. The washed porous Si was dried in a vacuum oven at 60° C. for 6 h.

CNT-Si: The dried porous Si with CNTs (K-Nanos 210p, purchased from Kumho Petrochemical, weight ratio of porous Si:CNT=85:15) was introduced with 3 hardened steel balls into a hardened steel vial. The milling process was carried out at 2.0 Hz frequency for 30 min (15 min+15 min milling time, with a 20 min break) using a milling machine (MM400, from Retsch®).

TSFCG $Li[Ni_{0.85}Co_{0.05}Mn_{0.10}]O_2$ (NCM): To prepare the spherical $[Ni_{0.85}Co_{0.05}Mn_{0.10}]OH_2$ precursor, the initial Ni-poor aqueous solution (Ni:Co:Mn=90:6:4 in molar ratio) from tank 2 composed of $NiSO_4.6H_2O$, $CoSO_4.7H_2O$, and $MnSO_4.5H_2O$ was slowly pumped into a Ni-rich stock solution (Ni:Co:Mn=100:0:0 in molar ratio) in tank 1, after which the homogeneously mixed solution was fed into a batch reactor (40 L) filled with a certain amount of deionized water, $NH_4OH$ solution (aq.), and NaOH solution (aq.) in a replenished N₂ atmosphere. Concurrently, a 4.0 mol L$^{-1}$ NaOH solution (aq.) and a NH₄OH chelating agent solution (aq.) were pumped separately into the reactor. In the initial stage of the process, Ni(OH)₂ was co-precipitated as a center composition and nickel-cobalt-manganese hydroxides of various compositions were then slowly accumulated onto the formed Ni(OH)₂ particles via a co-precipitation process. To construct the second concentration gradient layer onto the formed TSFCG hydroxide precursor, an aqueous solution in tank 3 with a Ni-poor concentration (Ni:Co:Mn=69:6:25 in molar ratio) was slowly pumped into the mixed solution in tank 1. The precursor powders were obtained through filtering, washing, and drying in a vacuum oven overnight at 100° C. The obtained TSFCG [Ni$_{0.85}$Co$_{0.05}$Mn$_{0.10}$]OH₂ was mixed with LiOH·H₂O and the mixture was then calcined at 750° C. for 15 h in flowing oxygen.

Li[Ni$_{0.85}$Co$_{0.11}$Al$_{0.04}$]O₂ (NCA): For the synthesis of Li[Ni$_{0.80}$Co$_{0.15}$Al$_{0.05}$]O₂, the synthesized [Ni$_{0.84}$Co$_{0.16}$](OH)₂ hydroxide precursor via the co-precipitation process was mixed with LiOH/H₂O and Al(OH)₃·xH₂O (Li/(Ni+Co+Al)=1.01 and Li/(Ni+Co+Al)=0.04 in molar ratio), and calcined at 750° C. for 10 h in flowing oxygen.

Process for making the anode: Mixing of about 60-95 wt % of active materials, with about 1-20 wt % of conductive 130 additives (e.g., Super P) and about 1-10 wt % of binder (e.g., polyvinylidene fluoride (PVDF) binder or SBR) in a solvent (e.g., N-methyl-2-pyrrolidone (NMP), N-ethyl-2-pyrrolidone (NEP), water) to form homogenous slurries in an agate mortar or planetary tank mixer. Coating of the as-prepared slurries on copper collector foils with a doctor blade or other coating techniques, such as slot dye, gravure, comma, curtain, roll coating. The loading amount is 1-6 mg/cm². The loading thickness is adjusted to 1-1.8 g/cm³. Drying at about 60-120° C. in a vacuum oven for 8-12 hours. Pressing of the electrodes to the desired coating thickness (10-200 μm, with electrode porosity within the range of 15-50%). Punching or slitting into desired shape.

Process for making the cathode: Mixing of about 85-97 wt % of active materials, with about 1-20 wt % of conductive 130 additives (e.g., Super P) and about 1-10 wt % of binder (e.g., polyvinylidene fluoride (PVDF) binder) in a solvent (e.g., N-methyl-2-pyrrolidone (NMP), N-ethyl-2-pyrrolidone (NEP), water) to form homogenous slurries in an agate mortar or planetary tank mixer. Coating of the as-prepared slurries on Aluminum or SUS collector foils with a doctor blade or other coating techniques, such as slot dye, gravure, comma, curtain, roll coating. The loading amount is 10-35 mg/cm². The loading thickness is adjusted to 2.5-3.6 g/cm³. Drying at about 60-120° C. in a vacuum oven for 8-12 hours. Pressing of the electrodes to the desired coating thickness (10-200 μm, with electrode porosity within the range of 15-50%). Punching or slitting into desired shape.

Analytical Techniques

The chemical compositions of the powders were analyzed via inductively coupled plasma spectrometry (ICP-MS, NexION® 300). The synthesized materials of the crystalline phase were characterized by powder high-resolution X-ray diffraction (HR-XRD, SmartLab®, Rigaku) using Cu Kα radiation. XRD data were obtained in the 2θ range between 10 and 80° with a step size of 0.03°. The particle morphologies and structures of all powders were observed by SEM (JSM 6400, JEOL Ltd) and TEM (JEOL 2010, JEOL Ltd). Element mapping was carried out using TEM (JEOL 2010F, JEOL Ltd). To obtain the localized composition of the CNT-Si and TSFCG, cross-sections of the particles were prepared by embedding the particles in an epoxy and grinding them flat. Line scans of the polished surfaces for the TSFCG precursor and the lithiated oxide were determined via EPMA (SIMADZU, EPMA-1720). The Brunauer-Emmett-Teller (BET) specific surface area of the samples was determined using an Autosorb-iQ 2ST/MP physisorption analyzer using the standard N2 adsorption and desorption isotherm measurements at 77 K.

Electrochemical Test

CNT-Si half-cell: The working anode was fabricated in a 60 wt % active material, 20 wt % super P carbon, and 20 wt % poly(acrylic acid) (PAA) binder ratio. The obtained slurry was coated onto Cu foil and roll-pressed. The coated electrodes were dried for 6 h at 80° C. in a vacuum oven. The mass loading of the active material was 1.3 mg cm$^{-2}$ and the thickness of the electrode was 16 μm. The electrolyte solution was 1.0 M LiPF$_6$ in ethylene carbonate-diethyl carbonate (EC:DEC, 1:1 by vol %) with 10 wt % fluoroethylene carbonate (FEC, TCI). Electrochemical testing was performed in a CR2032 coin-type half-cell adopting Li metal as a counter electrode. The cells were charged and discharged at 30° C. between 0.01 and 1.5 V (versus Li$^+$/Li) by applying a constant 1 C current (8 mA corresponds to 4000 mA g$^{-1}$).

TSFCG Li[Ni$_{0.85}$Co$_{0.05}$Mn$_{0.10}$]O₂ half-cell: The working cathode was fabricated in an 85 wt % prepared powders, 7.5 wt % carbon black, and 7.5 wt % poly(vinylidene fluoride) (PVDF) binder ratio. The obtained slurry was coated onto Al foil and roll-pressed. The electrolyte solution was 1.2 M LiPF$_6$ in ethylene carbonate-ethyl methyl carbonate (EC:EMC, 3:7 by vol %). Electrochemical testing was performed in a CR2032 coin-type half-cell adopting Li metal as a counter electrode. The cells were cycled galvanostatically between 2.7 and 4.3 V at 30° C. by applying a constant 0.5 C current (0.9 mA, 1 C current corresponds to 200 mA g$^{-1}$).

Li-ion full cell: Prior to use in the full cell, the CNT-Si based anode was pre-lithiated for 10 min by pressing it directly against lithium metal wetted by the 1.2 M LiPF$_6$ in ethylene carbonate-ethyl methyl carbonate with 2 vol % vinylene carbonate (VC, TCI). Electrochemical testing was performed in a CR2032 coin-type full cell using the CNT-Si anode, the TSFCG Li[Ni$_{0.85}$Co$_{0.05}$Mn$_{0.10}$]O₂ cathode, and 1.2 M LiPF$_6$ in ethylene carbonate-ethyl methyl carbonate with 2 vol % vinylene carbonate electrolyte. The cells were cycled galvanostatically between 2.0 and 4.15 V by applying a constant 1 C current (1.8 mA, 1 C current corresponds to 200 mA g$^{-1}$) at 30° C.

What is claimed is:

1. A rechargeable lithium-ion cell, comprising:
   an anode material,
   a cathode material, and
   an electrolyte,
   wherein the anode material comprises a composite consisting of nanoporous silicon encapsulated by carbon nanotubes, wherein an average particle diameter of the nanoporous silicon is in the range of about 10 to 20 nm,
   wherein the cathode material comprises a concentration gradient nickel-based lithium metal oxide represented by the following formula,

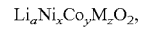
   $Li_aNi_xCo_yM_zO_2$, wherein 0.9<a<1.1, 0.4<x<1, 0<y<0.5, 0<z<0.5 and x+y+z=1, and
   wherein M is at least one selected from the group consisting of Mg, Ca, Sr, Ba, Ti, Zr, Nb, Mo, W, Zn, Al, Si, Mn, Cr, Fe, Mg, Sr, V, and a rare earth element.

2. The rechargeable lithium-ion cell according to claim 1, wherein the concentration gradient is a full-concentration gradient (FCG) with or without shell, a two-slope full-concentration gradient (TSFCG) with or without shell, or a core-shell-gradient (CSG) with or without shell.

3. The rechargeable lithium-ion cell according to claim 1, wherein M is Mn or Al.

4. The rechargeable lithium-ion cell according to claim 1, wherein the nickel-based lithium metal oxide is a compound selected from the group consisting of Li[Ni0.85Co0.05Mn0.10]O2, Li[Ni0.80Co0.05Mn0.15]O2 and Li[Ni0.8Co0.15Al10.05]O2.

5. The rechargeable lithium-ion cell according to claim 1, wherein the cathode material is comprised of Li[Ni0.85Co0.05Mn0.10]O2 containing a two-sloped full concentration gradient (TSFCG).

6. The rechargeable lithium-ion cell according to claim 1, wherein the silicon and carbon nanotubes composite comprises at least one secondary particle having at least two agglomerates of primary particles, wherein an average particle diameter of each primary particle is in the range of about 100 nm to about 500 nm, wherein an average particle diameter of the at least one secondary particle is in the range of about 2 to 3 µm.

7. The rechargeable lithium-ion cell according to claim 1, wherein an average particle diameter of the nanoporous silicon is in the range of about 10 to 15 nm.

8. The rechargeable lithium-ion cell according to claim 1, wherein the nanoporous silicon and the carbon nanotubes are mixed by ball-milling at a weight ratio of 85:15.

9. The rechargeable lithium-ion cell according to claim 1, wherein the nickel-based lithium metal oxide present in the cathode material is in amount of about 85 to 97% by weight.

10. The rechargeable lithium-ion cell according to claim 1, wherein the silicon and carbon nanotubes composite present in the anode material is in an amount of about 60 to 95% by weight.

11. The rechargeable lithium-ion cell according to claim 1, wherein the cathode material includes a conductive additive and a binder.

12. The rechargeable lithium-ion cell according to claim 1, wherein the anode material includes a conductive additive and a binder.

13. A battery containing at least one rechargeable lithium-ion cell according to claim 1.

* * * * *